United States Patent Office 3,515,598

Patented June 2, 1970

3,515,598

STABLE PREPARATION FOR THE PRODUCTION OF PRINTS ON AN OXIDE FILM ARTIFICIALLY PRODUCED ON ALUMINUM

Hans Schenkel, Neuewelt, near Basel, Switzerland, assignor to Durand & Huguenin A.G., Basel, Switzerland, a corporation of Switzerland No Drawing. Filed Mar. 29, 1967, Ser. No. 626,683
Claims priority, application Switzerland, Oct. 27, 1966, 15,580/66
Int. Cl. C23f 7/06, 5/04
U.S. Cl. 148—6.1 4 Claims

ABSTRACT OF THE DISCLOSURE

Oxide film on aluminum or aluminum alloy is printed with a printing preparation which contains organic solvent, a substance for regulating viscosity which is capable of swelling or dissolving in the organic solvent and also in water, and a low-molecular-weight hydrophobic substance which is insoluble in water and is sparingly volatile to nonvolatile at temperatures up to 100° C. The preparation preferably also contains a dyestuff which is soluble in organic solvents, but is sparingly soluble to insoluble in water.

It is known that oxide films artificially produced on aluminum can be dyed with dyestuffs dissolved either in water or organic solvents, for examples, by immersion in a dyebath. The dyestuff is then encapsulated in the oxide film by a treatment in boiling water, which is known as "sealing." This process yields fast dyeings which are much more resistant to abrasion than colorations produced by paints or lacquers. A number of processes are also known by means of which, for example, decorative effects can be produced on the oxide film by dyeing selected areas only.

The "resist" method of dyeing consists in covering areas of the oxide film which are not to be dyed with a water-insoluble film. This can be done, for example, by printing the areas which are to resist the dye liquor with a hydrophobic printing paste or by cementing a film over such areas. The unprotected areas are then dyed by immersing the workpiece in an aqueous dyestuff solution. Another method of producing a colored design consists in dying the whole surface area of the workpiece, covering with a resist agent the areas which are to remain colored, and then stripping the dyestuff from the unprotected areas by a chemical process. Multicolored designs are produced by repeating the process as required. The water-impermeable film is removed by means of an organic solvent subsequent to sealing.

However, so-called "direct printing" processes are also known which enable multicolored designs to be produced in one operation. For example, aqueous printing preparations which contain water-soluble dyestuffs can be applied in an appropriate manner to the oxide film. After the dyestuffs have been fixed in the oxide film by sealing, the superfluous printing paste still adhering to the surface is removed. It is also possible to use printing preparations which contain water-insoluble dyestuffs dissolved in an organic solvent. Since the dyestuffs are insoluble in water, no diffusion of dyestuff into the oxide film adjacent the printed areas can take place during subsequent sealing. It is thus possible to produce sharply outlined prints by this process.

Preparations for printing oxide films on aluminum have also been proposed which consist of a non-aqueous printing composition containing an organic solvent in which a water-insoluble dyestuff is dissolved. When dry, these preparations form a water-impermeable film which adheres to the surface of the work-piece. Preparation of this kind enable the direct printing process and the resist process to be combined, for example, in the production of colored designs on a background of a different color. The water-impermeable film has to be removed prior to further processing, and this is effected by means of an appropriate solvent.

This invention relates to a new preparation for the printing of oxide films artificially produced on aluminum and aluminum alloys, and to its application. In accordance with the invention, the preparation is characterized in that it contains (i) a substance for regulating viscosity which is capable of swelling or dissolving in organic solvents and also in water, and (ii) a hydrophobic substance with a molecular weight of at most 2000, which is insoluble in water and which is sparingly volatile to non-volatile at temperatures up to 100° C. In addition, the preparation preferably contains (iii) at least one dyestuff which is soluble in organic solvents, but sparingly soluble to insoluble in water.

When making the said new preparations up in the form of printing compositions, the aforesaid characteristic ingredients are made up in an organic solvent or mixture or organic solvents.

Suitable substances of the kind defined for regulating viscosity are, for example, polyvinylpyrrolidone and polymers of acrylic acid and acrylamide, but especially hydroxypropylated methyl cellulose. Generally, less than 5% by weight of these substances is needed to impart to the preparation the required degree of viscosity in combination with the hydrophobic substance in accordance with the invention. The property of being capable of swelling or dissolving in water required of the substance which regulates viscosity makes it possible to use aqueous cleansing agents to remove the film which forms on the oxide film when the preparation of the invention dries. When using prepations proposed hitherto for dyeing or printing oxide films on aluminum and which likewise contain organic solvents, but also substances which do not dissolve or swell in water, the film formed when the preparations dry is not affected by water and thus has to be removed with the aid of a suitable solvent.

The hydroxypropylated methyl cellulose is hydroxypropylmethylcellulose with a methoxy content of 20 to 35% and a hydroxypropyl content of 3 to 12%. Best results are obtained with hydroxypropylmethylcellulose with a methoxy content of 28 to 30% and a hydroxypropyl content of 7 to 12%.

As a further important ingredient, the preparations of the invention contain a water-insoluble, hydrophobic substance of low molecular weight (as previously defined) which is at least partially dissolved in the solvent used and which is at least sparingly volatile to non-volatile at the film by an aqueous solution and thus act as resists which are impermeable to aqueous dyestuff solutions. Furthermore, it is expedient to select a substance which is solid at room temperature (about 20° to about 30° C.), because this means that the printed areas will be dry when the printing paste dries, and are therefore not easily smudged if accidentally rubbed. The substance used must be non-volatile or, at most, sparingly volatile at the operating temperature employed, that is to say, at temperatures up to 100° C., in order to ensure that the water-repellent effect is not impaired by evaporation. Suitable substances are, for example, terpenes, terpene alcohols, for example, dihydroabietyl alcohol, diphenyl, naphthalene, acenaphthene and paraffins, but preferably chlorinated paraffins with a molecular weight of about 1000 and a Cl content of 10 to 70% by weight.

The solvent used in making up printing compositions may be selected from a very wide variety of inert organic solvents, for example, aliphatic, alicyclic and aromatic hydrocarbons, halogenated hydrocarbons, alcohols, glycols, halogenated alcohols, ethers, ether alcohols, ketones, keto alcohols, carboxylic acid esters, amides, nitriles, sulphoxides, sulphones and heterocyclic compounds. It is also possible to use mixtures of such solvents.

The solvent or solvents can, e.g. be selected from those conventionally employed in printing compositions. Thus, use may be made of one or more of the following: heptane, benzene, gasoline, cyclohexane, benzene, toluence, xylene, methylene chloride, chloroform, $CCl_4$, dichlorethane, trichlorethane, chlorobenzene, methanol, ethanol, propanol, isopropanol, cyclohexanol, benzyl alcohol, ethyleneglycol, butyleneglycol, 2-chloroethanol, diisopropylether, ethyleneglycoldimethylether, diethyleneglycolmonoethylether, acetone, methylethylketone, diisobutylketone, cyclohexanone, isophorone, diacetone, alcohol, methyl acetate, butyl acetate, formamide, dimethylformamide, dimethylsulfone, furane, tetrahydrofurane, tetrahydrofurfuryl alcohol, dioxane, dioxalane, sulfolan, N-methylpyrrolidone and many others.

The choice of solvent depends on various factors relating to the behavior of the solvent towards the other ingredients of the preparation and the execution of the process. The solvent must be capable of dissolving the dyestuff in the concentration in which it may be present. It must interact with the thickening agent in a manner such that a preparation of suitable consistency is formed. It must possess adequate dissolving power in respect of the resist. With regard to application, it must evaporate quickly enough to permit simple drying. When the printing preparations are used in screen printing, the rate of evaporation should be such that clogging of the screen does not occur when the printing process is interrupted. Furthermore, the solvent must not damage the material from which the screen is made, which is generally chrome-hardened gelatine. It is generally expedient to use a mixture of solvents for the simple manufacture of the preparations. Solid substances such as pigments may be incorporated in the preparations without any deleterious effect on their properties. Such substances may replace, in part, the thickening agent and are capable of shortening the drying time by virtue of their large surface area. Suitable pigments are, for example, diatomaceous earths, titanium dioxide, barium sulphate, aluminum hydroxide, and silicates having the characteristics of clay minerals.

Dyestuffs soluble in organic solvents which are suitable for use in the process of the invention are primarily those which are sparingly soluble to insoluble in water. The degree to which the dyestuff used has to be soluble in the organic solvent depends on the depth of tint required. Pale tints are obtained with concentrations up to about 1%, whereas concentrations of up to 5% are required for deep tints. The dyestuffs primarily used are those listed in Part I of the Color Index under "Solvent Dyes." However, it is also possible to use selected dyestuffs belonging to the "Disperse Dyes" or "Vat Dyes" series, provided they display a sufficient degree of solubility in organic solvents. Chemically, the dyestuffs used may belong to a wide variety of classes, for example, they may be azo dyestuffs, anthraquinone dyestuffs, nitro dyestuffs of phthalocyanines. It is also possible to use mixtures of different dyestuffs.

By oxide films artificially produced on aluminum is meant those films which are suitable for dyeing because of their adsorptive power and large interior surface area. They can be produced by chemical means, for example, by oxidation with chromates, and also primarily, by anodic oxidation. The preparations of the invention are suitable for coloring both pure aluminum and aluminum alloys, provided the latter show similar behavior to aluminum in respect of oxidation, dyeing and sealing. Oxide films which have a color of their own as a result of special oxidation processes can also be treated in accordance with the invention.

The preparations of the invention can be applied to the oxide films by a wide variety of known printing techniques. They can be applied dropwise, by spraying, by means of a rubber roller or rubber stamp, by brush, sponge or screen, or by immersing the work-piece in the preparation. It is specially advantageous to apply them by the screen-printing technique. It is also possible to use combinations of these processes. Preparations having different colors may be applied simultaneously or successively, it being possible for the individual tints to overlap. When overlapping occurs, compound tints are formed because the preparations of the invention do not form films and are permeable to the over-printed dyestuffs. The preparations may be applied manually or by machine. The preparations are suitable for printing both semi-finished products, for example, foils and sections, and a very wide variety of finished products.

Preparations of the invention which do not contain a dyestuff soluble in organic solvents are suitable for coloring oxide films by the resist-printing process. By virtue of their perfect resist effect, a colorless design on a colored background is obtained when the work-piece is cross-dyed with an aqueous dyestuff solution. Pigments which are insoluble in water or organic solvents and which do not color the oxide film may be added to the preparations to provide temporary marking of the resisted areas.

However, the preparations which are specially useful are those which contain a dyestuff which is soluble in an organic solvent. Preparations of this kind can be applied to an oxide film, for example, by one of the direct printing techniques, to produce a colored design which is fast to rubbing on a colorless background. However, the preparations are also suitable for application by a combination of the direct and resist printing process and can thus be used for producing colored designs on a colored background.

The preparations of the invention are distinguished by the fact that they produce prints having extremely sharp outlines and can therefore be used, for example, for printing very small lettering and technical diagrams; this is of great importance where the manufacture of instruction plates for machines and graduated plates and dials for measuring instruments are concerned. A special, and surprising, advantage which is offered by the preparations is that the coating adhering to the surface of the work-piece subsequent to the coloration process can be removed in a very simple manner by rinsing or rubbing with water or with aqueous cleansing agents. Thus, the expensive cleaning process involving the use of organic solvents, which is an essential part of the processes known hitherto, is rendered superfluous.

The following examples illustrate the invention, without, however, limiting it in any way. The parts and percentages are by weight.

EXAMPLE 1

4 parts of hydroxypropylmethylcellulose with a methoxyl content of 28 to 30% and hydroxypropyl content of 7 to 12% are introduced into 27 parts of isopropanol while stirring vigorously. A solution of 16 parts of chlorinated paraffin of a molecular weight of about 1000 which is solid at room temperature and which contains 70% of chlorine, and 5 parts of the dyestuff Solvent Orange 5 (Color Index) in 48 parts of benzyl alcohol is prepared at 50 to 70° C. and then run in quickly.

The preparation so-obtained is printed onto anodized sheet aluminum by means of a conventional screen-printing device. The preparation is allowed to dry at room temperature for one hour. The aluminum sheet is then sealed by a treatment for thirty minutes in boiling water, during which process the coating is loosened and partially removed.

When the residual coating has been removed by rinsing with cold water, an even, orange design having sharp outlines on a colorless background is obtained; the design possesses excellent properties of fastness.

Equally good results can be obtained by replacing the above dyestuff with Solvent Red 50, Solvent Violet 1 and Solvent Blue 53.

EXAMPLE 2

A preparation obtained by dissolving 10 parts of dihydroabietyl alcohol in 50 parts of benzyl alcohol and then running the solution so-obtained into a mixture of 4 parts of hydroxypropylmethylcellulose according to Example 1, in 27 parts of isopropanol is printed onto anodized sheet aluminum by means of a rubber stamp.

The printed sheet aluminum is dried for 10 minutes at 80° C. and then dyed for 15 minutes at 55° C. in an aqueous dyebath containing 6 parts of the dystuff Mordant Red 83 (Color Index) per 1,000 parts of water. The sheet aluminum is subsequently treated for 30 minutes in boiling water. When the metal has been brushed with cold water, a colorless design on a red background is obtained.

EXAMPLE 3

A preparation having the composition indicated in Example 1, but in which the orange dyestuff is replaced by Solvent Black 1 (Color Index), is printed onto anodized sheet aluminum by means of a screen-printing machine. The preparation is dried for one hour at room temperature, whereupon the aluminum is dyed for 15 minutes at 20° C. in a dyeing solution containing 1 part of the dyestuff Acid Yellow 167 (Color Index) per 1,000 parts of water. The metal is subsequently treated for 30 minutes in boiling water. The coating is removed by means of an aqueous cleansing agent and a sharply-outlined black design on a yellow background is obtained.

What is claimed is:

1. A stable composition for the production of prints on oxide films artificially produced on aluminum or aluminum alloys consisting essentially of:

(a) 4 to 6 percent of a hydroxypropylated methyl cellulose with a hydroxypropyl content of 3 to 12 percent and a methoxyl content of 20 to 35%, (b) a chlorinated paraffin with a molecular weight of 1,000 and a chlorine content of 70%, present in an amount sufficient that when said preparation is applied to the oxide film to be treated, it will render said film impermeable to aqueous dyestuff solutions, (c) 1 to 5% of the dyestuff which is soluble in organic solvents but sparingly soluble to insoluble in water, (d) an inert organic solvent which is capable of dissolving a dyestuff, to interact with the thickening agent of (a) in order to obtain a suitable consistency for the printing composition and which evaporates after the printing paste by simple drying, selected from the group consisting of chloroform, tetrachloromethane, dichloroethane, trichloroethane, methanol, ethanol, propanol, isopropanol, benzyl alcohol, cyclohexanol, tetrahydrofurfuryl alcohol, methyl acetate, butyl acetate, acetone and methylethylketone.

2. A stable preparation according to claim 1, consisting of 4% of hydroxypropylated methyl cellulose with a hydroxypropyl content of 7 to 12% and a methoxyl content of 28 to 30%, 16% of the chlorinated paraffin, 5% of a dyestuff, 27% of isopropanol and 48% of benzyl alcohol.

3. In a process for printing oxide films artificially produced on aluminum or aluminum alloys, the improvement according to which a preparation as defined in claim 1 is applied to the oxide films and then dried, sealed in aqueous medium and cleaned with water.

4. In a process for printing films artificially produced on oxide or aluminum alloys, the improvement according to which a preparation as defined in claim 1, is applied to the oxide films and then dried; the oxide film is then dyed in an aqueous dyestuff solution, sealed in an aqueous medium and cleaned with water.

References Cited

UNITED STATES PATENTS

| | | | |
|---|---|---|---|
| 1,863,332 | 6/1932 | Hailwood et al. | 8—94 X |
| 2,614,912 | 10/1952 | Rice | 148—6.1 X |
| 2,778,790 | 1/1957 | Sobol | 148—6.1 X |
| 2,812,295 | 11/1957 | Patrick | 204—35.1 X |
| 2,990,304 | 6/1961 | Cybriwsky et al. | 204—38 X |
| 3,092,523 | 6/1963 | Fromson | 148—6.1 |
| 3,290,232 | 12/1966 | Dunning | 148—6.1 X |
| 3,369,970 | 2/1968 | McLaughlin et al. | 8—94 X |

RALPH S. KENDALL, Primary Examiner

U.S. Cl. X.R.

8—94; 106—191; 204—35.1, 38.1